Dec. 1, 1959   S. ROBINSON   2,915,620
DEVICE FOR SUPPORTING AND ILLUMINATING CHRISTMAS TREES
Filed Sept. 10, 1956
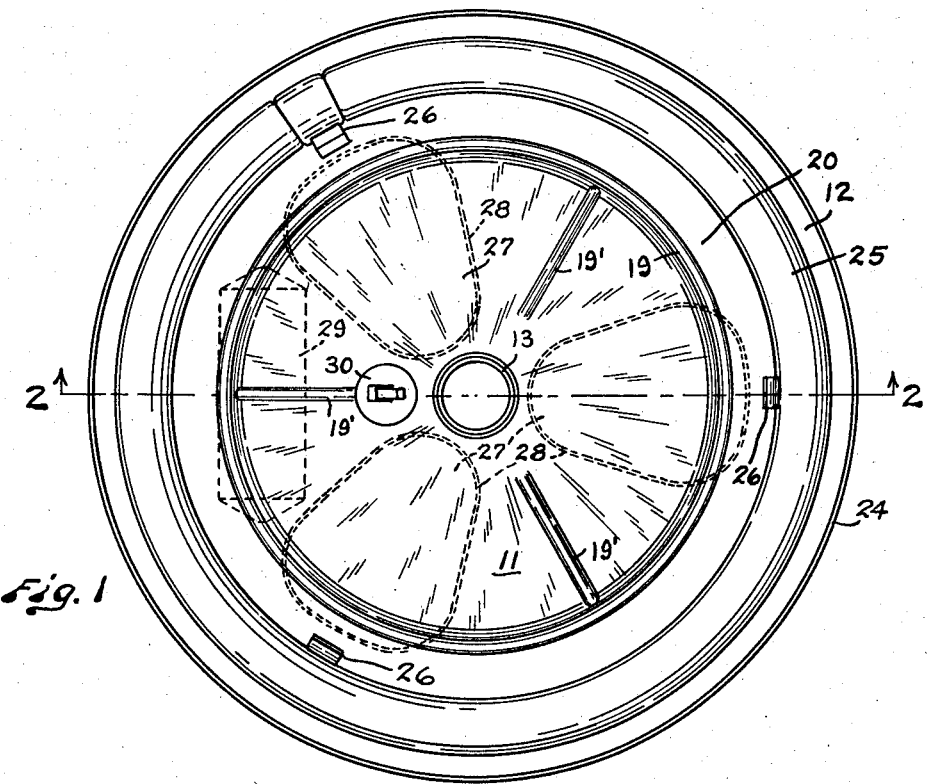
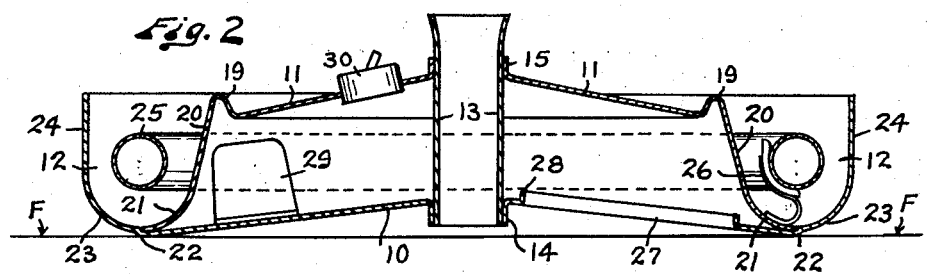
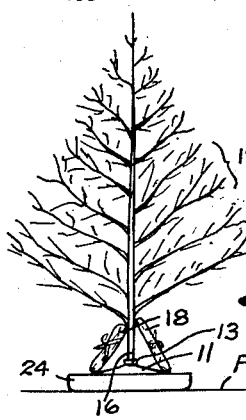
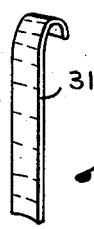
INVENTOR.
Sirman Robinson
BY
Fred C. Matheny
ATTORNEY United States Patent Office 2,915,620
Patented Dec. 1, 1959

2,915,620

DEVICE FOR SUPPORTING AND ILLUMINATING CHRISTMAS TREES

Sirman Robinson, Tacoma, Wash.

Application September 10, 1956, Serial No. 608,823

2 Claims. (Cl. 240—10)

This invention relates to a device for supporting and illuminating Christmas trees.

An object of this invention is to provide means for and a method of illuminating Christmas trees more safely in that danger of fire is minimized, and more efficiently and decoratively in that the entire tree is fully and completely illuminated with evenly distributed soft light which is directed from the base of the tree upwardly through the branches.

Another object is to provide a Christmas tree illuminating device which also serves as a stand for supporting a Christmas tree upright and in proper relation to tree illuminating means so that the most efficient and pleasing illumination of the tree is obtained.

Another object is to provide a device for supporting and illuminating Christmas trees comprising an upwardly directed circular light reflector, tree supporting means positioned axially of said reflector and a tube type circular electric lamp disposed within said reflector.

Another object is to provide a combined Christmas tree stand and lamp mounting having a frame part on which packages can be conveniently placed near and around and against the butt end portion of a tree in a position affording good visibility of the packages and without danger of the packages sliding down over the lamp and interfering with the lighting of the tree.

Other objects are to provide a Christmas tree support and illuminating device which is simple and compact in construction, ornamental in appearance, not expensive to manufacture and one which will save the user time and trouble in setting up and decorating a Christmas tree.

Other objects of this invention will be apparent from the following description taken in connection with the accompanying drawings.

Figure 1 is a top plan view of a device for supporting and illuminating Christmas trees constructed in accordance with my invention, parts being shown by dotted lines.

Fig. 2 is a view in cross section taken substantially on broken line 2—2 of Fig. 1, parts being shown in elevation.

Fig. 3 is a small scale elevational view showing this device as it may appear when in use and supporting a Christmas tree.

Fig. 4 is a detached view showing one of a plurality of similar adjustment inserts which are furnished with this device and used in making adjustments to trees of smaller size.

Like reference numerals refer to like parts throughout the several views.

In a general way this device comprises frame means adapted to rest on a floor and serve as a base, tree holding means positioned centrally of said frame means and capable of receiving the butt portion of a tree and supporting the tree in an upright position and tree illuminating means of circular shape and substantial diameter supported by the frame means and extending around the tree supporting means in a position where it will direct light upwardly through a tree held by the supporting means.

The exemplary form of frame means herein shown for purpose of illustration comprises two dish shaped members 10 and 11 of substantial depth and of substantially different diameters disposed face to face one within the other in concentric relation so that they form a circumferentially positioned circular lamp receiving reflector 12 of approximately U shaped cross section. The larger dish shaped member 10 forms the bottom frame part and the smaller dish shaped member 11 the top frame part. These parts 10 and 11 may conveniently be formed of sheet metal. Both of said frame parts 10 and 11 are centrally perforated to receive a normally upright tree supporting tube 13 and said frame parts 10 and 11 are provided respectively with flanges 14 and 15 which are welded or otherwise rigidly secured to the tube 13. The tube 13, see Fig. 3, is adapted to receive the lower end portion 16 of a tree 17 and support said tree in an upright position when the lower frame part 10 rests on a floor F. Preferably the bottom end of the tube 13 and the flange 14 terminate a short distance above the plane of the floor on which the device rests to avoid interfering with the stability of the device on the floor.

The top wall of the upper frame part 11 preferably has a slight slope downwardly from the center outwardly but is near enough horizontal so that packages 18 can be placed thereon. Also preferably the peripheral portion of said top wall has a package retaining upwardly extending rim or stop member 19 which prevents packages from sliding over the reflector channel 12 when said packages are leaned against the lower portion of the tree, as shown in Fig. 3. Also preferably radial ribs 19' are formed in the top member or part 11 extending from near center to the rim 19 for reinforcing purposes.

The peripheral wall 20 of the upper frame part 11 is preferably somewhat convergent, upwardly considered, in the interest of better light distribution and this wall 20 terminates in an outwardly curved portion 21 which forms part of the bottom of the reflector. Preferably the lower frame part 10 has an annular offset 22 to receive the terminal or marginal portion of the part 21 without leaving any shoulder within the reflector. The terminal part 21 is spot welded or otherwise rigidly secured to the part 10 at the location of the offset 22 to strengthen the structure and render it more rigid. The lower housing part 10, outwardly from the offset portion 22, has an upwardly curving portion 23 which terminates in an upwardly directed circumferential wall 24.

A circular electric lamp tube 25 of fluorescent type is supported within the circular reflector channel 12 by any suitable means, such as spring clips 26. The outer upright wall of the frame part 10 preferably extends far enough above the plane of the lamp 25 so that said lamp will be shielded from the view of persons standing a reasonable distance away from the tree 17. A plurality of relatively large openings 27 are provided in the lower frame part 10 and preferably the metal at the margins of these openings is bent upwardly to form strengthening flanges 28. The space between the two frame parts 10 and 11 conveniently affords room for the housing of electrical equipment, such as a transformer 29 used in connection with the lamp 25. The openings 27 are large enough so that this equipment can be installed and serviced through them. 30 is an electric switch which can be installed, as shown in the upper housing part 11.

Preferably the upper end portion of the tree supporting tube 13 is expanded to facilitate the insertion therein of the tree. Also, since the butt portions of trees will vary somewhat in diameter, I provide a plurality of insert members 31, Fig. 4, which are used in the tube 13 in the event the butt portion of a tree is too small to fit snugly within said tube. The inserts 31 preferably have a transverse curvature to conform to the curvature of the tube 13 and said inserts may be of any desired thickness and preferably are bent at one end to form hooks 32 which hook over the top end of the tube 13 so that the inserts 31 are suspended within the tube 13. Tree butts too large to enter the tube 13 are trimmed down to correct diameter.

This device provides a stand always ready for use and it relieves the user of stringing lights in and through Christmas trees thereby saving time and labor in setting up these trees. Also the lamp 25 does not become heated in operation and it does not come into direct contact with the tree so that danger of fire is minimized.

The lower frame part 10 is large enough in diameter so it will support a tree of the maximum height the device is intended to support without danger of tipping. The circular lamp 25 is centered relative to the tree supporting tube 13 and is of large enough size so that it is spaced outwardly a substantial distance from said tube 13 and when a tree 17 is supported in said tube the light from the lamp 25 will be evenly distributed entirely around the tree and will pass upwardly through the branches of said tree and flood the tree with a soft and pleasing light. The lamp 25 is readily removable and these lamps can be made in different colors thus affording color selectivity.

The foregoing description and accompanying drawings clearly disclose a preferred embodiment of this invention but it will be understood that changes may be made within the scope of the following claims.

I claim:

1. In means for supporting and illuminating a Christmas tree, a relatively deep dish shaped lower frame part having an outer wall which is approximately perpendicular to the bottom thereof; a relatively deep dish shaped upper frame part of smaller diameter than said lower frame part disposed in inverted position within said lower frame part concentrically thereof and cooperating with said lower frame part in providing in the circumferential portion of said frame parts a relatively deep circular light reflector extending around said upper frame part and positioned to direct light in a general direction perpendicular to and upwardly from said two frame parts; a circular tube type lamp supported within said reflector; the outer wall of said reflector extending a substantial distance above the top plane of said lamp, whereby said lamp will be shielded from direct view of persons at a substantial distance away from the reflector; and tree supporting means carried by said two frame parts and positioned axially thereof.

2. In means for supporting and illuminating a Christmas tree, a relatively deep dish shaped lower frame part having an outer wall which is approximately perpendicular to the bottom thereof; a relatively deep dish shaped upper frame part of smaller diameter than said lower frame part disposed in inverted position within said lower frame part concentrically thereof and cooperating with said lower frame part in providing in the circumferential portion of said two frame parts a relatively deep circular light reflector of approximately U-shaped cross section extending around said upper frame part and positioned to direct light in a general direction perpendicular to and upwardly from said two frame parts, the top wall of said upper frame part being slightly inclined downwardly from the center outwardly and having adjacent its outer margin an upwardly extending annular stop member capable of limiting outward movement of articles supported on said upper frame part; a circular tube type lamp supported within said reflector, the outer wall of said lower frame part extending a substantial distance above the top plane of said lamp; and an axially positioned upright tree supporting tube extending through and rigidly secured to and supported by said two frame parts and providing a rigid connector between the medial portions of said two frame parts.

References Cited in the file of this patent

UNITED STATES PATENTS

| | | |
|---|---|---|
| 1,598,016 | Runser | Aug. 31, 1926 |
| 1,631,227 | See | June 7, 1927 |
| 1,847,687 | Biertuempfel | Mar. 1, 1932 |
| 1,853,164 | Block | Apr. 12, 1932 |
| 1,935,729 | Rosenbaum | Nov. 21, 1933 |
| 2,477,132 | Rowe | July 26, 1949 |
| 2,487,235 | Goss | Nov. 8, 1949 |
| 2,532,931 | Miller | Dec. 5, 1950 |
| 2,656,453 | Segil | Oct. 20, 1953 |
| 2,674,687 | Priebe | Apr. 6, 1954 |
| 2,771,260 | Thom | Nov. 20, 1956 |